Patented Feb. 4, 1930

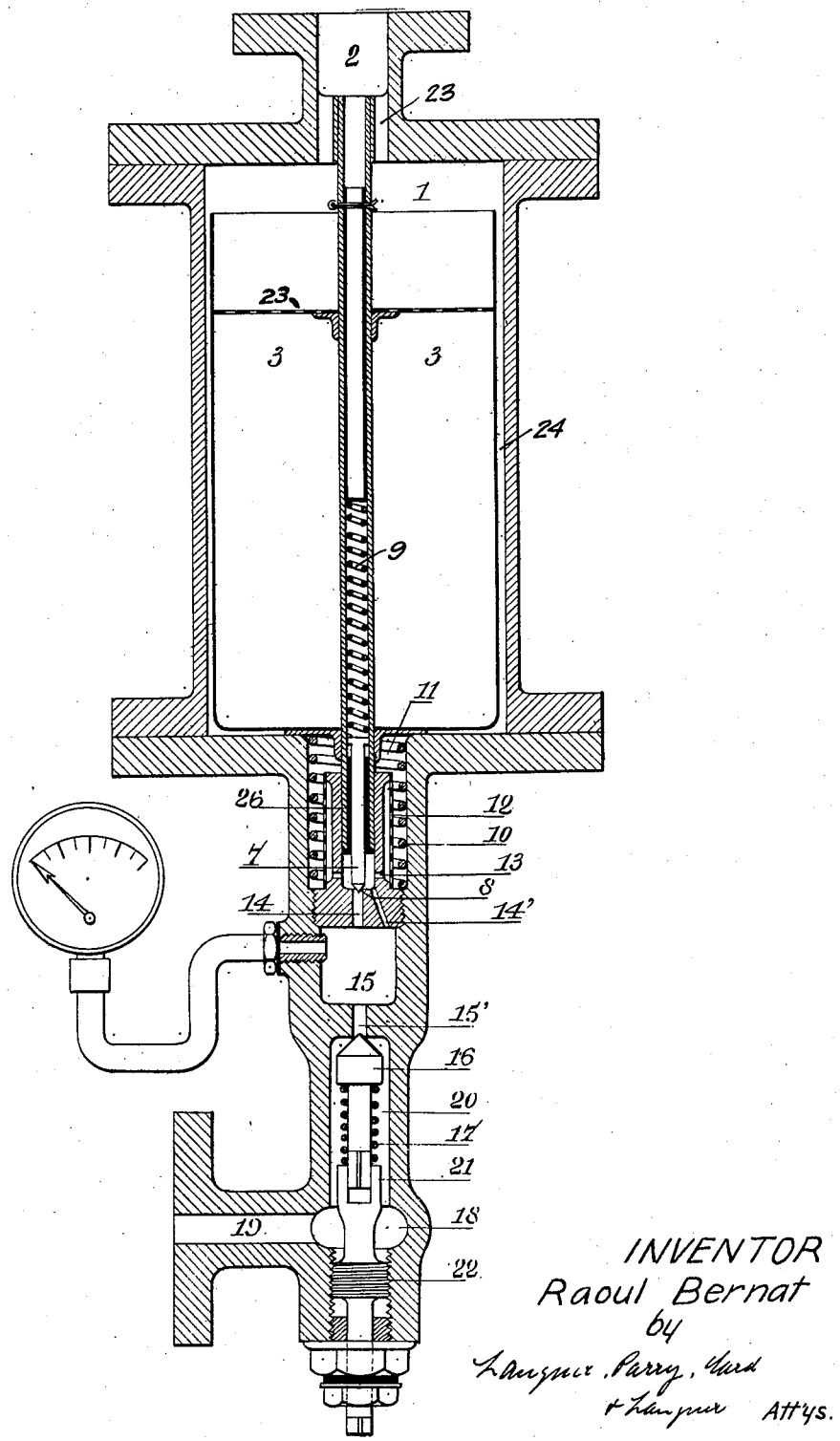

1,746,184

UNITED STATES PATENT OFFICE

RAOUL BERNAT, OF BORDEAUX, FRANCE

AUTOMATIC REGULATING DEVICE

Original application filed March 20, 1925, Serial No. 17,139, and in France April 18, 1924. Divided and this application filed February 3, 1926. Serial No. 85,773.

My present invention relates to an automatic regulating device in which the pressure release is effected in two stages such as the device described in the copending application Serial No. 17,139, filed on the 20th day of March, 1925, patented November 29, 1929, Number 1,651,112, and of which this application is a division.

The device forming the subject matter of my present invention has for its essential characteristic that the second release valve is an automatic valve and that means are provided, in the first release valve, for assuring the flowing of a predetermined minimum quantity of the fluid.

By these improvements I obtain an increased regularity of the delivery of such apparatus.

In the drawing the sole figure is a longitudinal section through the device of my invention.

This drawing shows, by way of example a form of execution of this apparatus. The liquefied gas arrives through a tube 2 into a container 1 having therein a float 3 open at its upper end. The movement of the float under the combined action of its weight and of the spring 10 causes the opening or closing of the valve 7 and the liquid passes through the casing 11 and through the passages 13 and 14 into the expansion chamber 15.

This chamber 15 comprises at its lower part an orifice 15' closed by the needle valve 16.

A spring 17 supports the needle valve 16 against the lower end of the orifice 15'. This spring can be put more or less in tension by adjustment of the socket 21 having a threaded enlargement 22 fitting in a neck at the lower end of the chamber 18.

Between the chamber 11 and the chamber 15 is disposed a perpetually open passage 14' for the passage of the liquefied gas. The cross section of this passage is such that there is always a minimum flow insufficient for ordinary needs. The control of the flow therefore extends only to the additional quantity necessary and can thus be rendered much more delicate.

This passage 14' can be designed to allow a fixed quantity of liquefied gas to pass therethrough, but it could equally well, in large machines for example, be provided with a needle valve so as to obtain the desired flow.

This device functions as follows:

The liquefied gas from the condenser arrives at the opening 2 and falls through the orifices 23 into the float 3 which it fills. Then the float overflows and the liquefied gas rises in the annular space 24 around the float 3.

When this occurs, the spring 10 has only to support the weight of the float 3 less the weight of the fluid displaced, because the float is surrounded by liquid, the float is therefore raised, lifting the needle valve 7 so that a certain quantity of liquefied gas runs out through the passage 14 into the chamber 15.

After liquefied gas has run out, a gaseous atmosphere surrounds the upper part of the float 3. The relative weight of the float increases in proportion to the fall of level of the liquid in the annular space 24. The float therefore descends again compressing the spring 10 and carrying with it the needle valve 7 which descends again on its seating. It should be noted that in this movement the small spring 9 is compressed, which reduces the shock at the instant the needle valve seats.

The movements of opening and closing the passage 14 succeed each other with a frequency directly proportional to the supply of the liquefied gas at the tubular opening 2, but only liquefied gas is allowed to pass the valve 7 to the exclusion of any gas.

When the liquefied gas reaches the chamber 15 it has no other way out than the passage 15', and a greater or less pressure must always exist in the chamber 15 sufficient to open the valve 16.

The opposing spring 17 suitably compressed by the sleeve 21, the latter itself controlled by the threaded member 22, enables any desired pressure to be maintained in the chamber 15.

When the needle 16 is raised the liquefied gas passes through 20 into the chamber 18 and from there is led by the tubular opening 19 into the freezing apparatus.

To crystallize ideas on the subject one may take for example a refrigerating machine working with ammonia, with say, a pressure of nine atmospheres in the condenser and of 1½ in the freezing apparatus, which are the normal working conditions.

If expansion is effected solely in the device 8, 14, the float has to overcome a pressure of 7½ atmospheres. And as it is working with a liquid whose density is only about 0,630 it would have to be made very large.

The above described device, however, allows a pressure of about 7½ atmospheres to be maintained in the chamber 15, which gives for the first stage of the expansion a difference of only 1½ atmospheres. This therefore gives a pressure difference five times less than that in the case of direct expansion and in consequence the volume of the float can be reduced by four fifths with respect to the volume it must have in the case where the expansion is effected in a single stage.

A manometer connected to the chamber 15 allows the pressure in the chamber to be regulated to the most suitable value by means of the valve 22.

It is obvious that the description of this example of execution is not limitative of my invention. It is also possible to provide, on a regulator of the kind herein described an injector such as described in my patent hereinbefore referred to for obtaining the injection, in the main circuit, of liquefied gas contained in a secondary receiver or circuit.

Having now particularly described my present invention and the manner in which the same is to be performed,

I claim:

1. An expansion unit for refrigerating systems comprising a reservoir for receiving liquid refrigerant, a first expansion chamber, means connecting the same to said reservoir, a valve controlling said connecting means, and a float in said reservoir for controlling said valve, a second expansion chamber connected to said first expansion chamber, and a pressure actuated valve in said last named connection.

2. An expansion unit for refrigerating systems comprising a reservoir for receiving liquid refrigerant, a first expansion chamber, means connecting the same to said reservoir, said means having two passages, a valve controlling one passage, the other passage establishing communication between the reservoir and the first expansion chamber, this passage having a cross sectional area less than that necessary for the minimum feed of the device, a second expansion chamber connected to the first expansion chamber and means to control said connection.

3. An expansion unit for refrigerating systems comprising a reservoir for receiving liquid refrigerant, a first expansion chamber, means connecting the same to said reservoir, a valve controlling said connecting means, and a float in said reservoir for controlling said valve, a second expansion chamber connected to said first expansion chamber and an automatic spring valve in the connection between the expansion chambers, and means adjustable to vary the tension of the spring of the last mentioned valve, from the exterior.

In testimony whereof I have signed my name to this specification.

RAOUL BERNAT.